(12) United States Patent
Sugawara et al.

(10) Patent No.: US 6,526,072 B1
(45) Date of Patent: Feb. 25, 2003

(54) WAVELENGTH CONVERSION DEVICE COMPOSED OF SINGLE-CRYSTAL LITHIUM TETRABORATE, LASER APPARATUS PROVIDED WITH THE SAME AND METHOD OF CONVERTING WAVELENGTH USING THE SAME

(75) Inventors: Tamotsu Sugawara, Omiya (JP); Hiroyuki Shiraishi, Omiya (JP); Ryuichi Komatsu, Ube (JP); Valentin Petrov, Berlin (DE)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/533,074

(22) Filed: Mar. 22, 2000

(30) Foreign Application Priority Data

Mar. 23, 1999 (JP) ............................................. 11-077075
Dec. 14, 1999 (JP) ............................................. 11-354849

(51) Int. Cl.$^7$ .............................. H01S 3/10; H01S 3/17; G02F 1/35
(52) U.S. Cl. .............................. 372/21; 372/22; 372/23; 372/40; 359/326
(58) Field of Search .............................. 372/21, 22, 23

(56) References Cited

U.S. PATENT DOCUMENTS

| 5,740,190 A | * | 4/1998 | Moulton ....................... 372/23 |
| 5,805,626 A | * | 9/1998 | Komatsu et al. ............... 372/41 |
| 2002/0024987 A1 | * | 2/2002 | Caprara et al. ............... 372/92 |

* cited by examiner

Primary Examiner—Paul Ip
Assistant Examiner—Armando Rodriguez
(74) Attorney, Agent, or Firm—Oblon, Spivak, McClelland, Maier & Neustadt, P.C.

(57) ABSTRACT

A laser apparatus includes a wavelength conversion device composed of single crystal lithium tetraborate for converting a wavelength by passing an incident laser beam therethrough. The relationship between the orientation of the crystal axis of the single-crystal lithium tetraborate and the direction of incidence of the laser beam is determined so as to prevent beam walk-off from occurring in the laser beam propagating through the conversion device. A method of converting a wavelength by passing an incident laser beam through a wavelength conversion device composed of single-crystal lithium tetraborate is also disclosed.

4 Claims, 3 Drawing Sheets

WAVELENGTH CONVERSION DEVICE COMPOSED OF SINGLE-CRYSTAL LITHIUM TETRABORATE, LASER APPARATUS PROVIDED WITH THE SAME AND METHOD OF CONVERTING WAVELENGTH USING THE SAME

BACKGROUND OF THE INVENTION

1. Field of the Invention

The present invention relates to a wavelength conversion device composed of single-crystal lithium tetraborate ($Li_2B_4O_7$) and a laser apparatus provided with the wavelength conversion device, and also to a method of converting a wavelength using the same.

2. Description of the Related Art

Short-wavelength solid-state lasers operating in the ultraviolet and visible regions, which are provided with infrared solid-state lasers, such as YAG lasers, and wavelength conversion devices for reducing the wavelength of incident light by half have advantages over conventional argon lasers and excimer lasers because they are very safe, easy to maintain, inexpensive, and small and compact. Accordingly, researches have been intensively conducted on short-wavelength solid-state lasers.

In particular, a method of generating continuous wave (CW) ultraviolet light by second harmonic generation (SHG) of an argon laser is receiving attention. In this method, continuous light that is not obtainable by an excimer laser can be generated, and a laser beam in a wavelength band of 240 nm, which is indispensable for fiber gratings, can be generated. Thus, such generation will be an important light source for laser material processing in future.

Currently, only BBO ($BaB_2O_4$) is used as a wavelength conversion crystal for producing the second harmonic of the argon laser. The crystal has a large nonlinear coefficient, which is advantageous.

However, since the wavelength conversion device composed of the BBO crystal is a critical phase matching (CPM) type device, the angular bandwidth is small, the walk-off angle is large, and thin crystals must be used. Thus, it is not possible to increase the conversion efficiency. The angular bandwidth refers to an angle (unit: mrad·cm) obtained when an output of a laser beam, in which the wavelength is converted when a phase matching angle (an angle between the laser beam and the c-axis when the wavelength conversion device produces a second harmonic) is rotated by a microscopic angle, corresponds to half of the output of the second harmonic at the exact phase matching angle. Furthermore, the BBO crystal itself generates heat by absorbing the second harmonic, and thus the phase matching conditions are changed, resulting in output variation in the second harmonic. The crystal also has a short life. Therefore, although the generation of continuous wave ultraviolet light by the second harmonic of the argon laser is very effective, the industrial use thereof has not yet been implemented.

SUMMARY OF THE INVENTION

It is an object of the present invention to provide a wavelength conversion device composed of single-crystal lithium tetraborate which is suitable for wavelength conversion by non-critical phase matching (NCPM) and which has a large angular bandwidth and excellent durability to laser light.

It is another object of the present invention to provide a laser apparatus which stably generates a continuous wave laser beam having a wavelength of 244 nm or 248.25 nm, using a wavelength conversion device composed of single-crystal lithium tetraborate in which wavelength conversion is performed by non-critical phase matching.

In one aspect of the invention, as shown in FIG. 1, a wavelength conversion device 10 is composed of single-crystal lithium tetraborate which is cut so that the direction of propagation of light is set in the direction satisfying the relationship $\theta m=90°\pm2°$, where $\theta m$ is an angle between the direction of propagation of light and the c-axis.

In accordance with the present invention, with respect to the single-crystal lithium tetraborate cut in such a manner, by orienting an incident laser beam in the direction of propagation of light at a predetermined temperature, beam walk-off does not occur, and the wavelength conversion device 10 which is suitable for wavelength conversion by non-critical phase matching is obtained.

In another aspect of the invention, as shown in FIG. 2, in a laser apparatus in which the wavelength is converted by passing an incident laser beam through a wavelength conversion device 10 composed of single-crystal lithium tetraborate, the relationship between the orientation of the crystal axis and the direction of incidence of the laser beam is determined so as to prevent beam walk-off from occurring in the laser beam propagating through the conversion device 10.

Preferably, as shown in FIG. 2, in the wavelength conversion device 10 of the laser apparatus, the single-crystal lithium tetraborate is cut so that the direction of propagation is set in the direction satisfying the relationship $\theta m=90°\pm2°$, where $\theta m$ is an angle between the direction of propagation and the c-axis.

In accordance with the present invention, by orienting an incident laser beam in the direction of propagation of light at a predetermined temperature, beam walk-off does not occur in the wavelength conversion device 10, and the laser apparatus using non-critical phase matching is obtained.

Preferably, the laser apparatus includes a temperature regulator 13 for maintaining the wavelength conversion device 10 composed of single-crystal lithium tetraborate within a predetermined temperature range.

Accordingly, the wavelength conversion device 10 is maintained at a predetermined temperature by the temperature regulator 13.

In another aspect of the invention, a method of converting a wavelength by passing an incident laser beam through a wavelength conversion device 10 composed of single-crystal lithium tetraborate includes the steps of determining the relationship between the orientation of the crystal axis and the direction of incidence of the laser beam so that beam walk-off does not occur in the laser beam propagating through the wavelength conversion device 10, maintaining the wavelength conversion device 10 in a temperature range of 13.5±10° C., preferably 13.5±2° C. and passing a laser beam having a wavelength of 488 nm through the wavelength conversion device 10 so that the wavelength is converted into 244 nm.

Accordingly, a continuous wave laser beam having a wavelength of 244 nm can be generated stably.

In another aspect of the invention, a method of converting a wavelength by passing an incident laser beam through a wavelength conversion device 10 composed of single-crystal lithium tetraborate includes the steps of determining the relationship between the orientation of the crystal axis and the direction of incidence of the laser beam so that beam walk-off does not occur in the laser beam propagating through the wavelength conversion device 10, maintaining the wavelength conversion device 10 at a temperature of 300° C. to 500° C., and passing a laser beam having a wavelength of 496.5 nm through the wavelength conversion device 10 so that the wavelength is converted into 248.25 nm.

Accordingly, a continuous wave laser beam having a wavelength of 248.25 nm can be generated stably.

Preferably, in either one of the methods of converting a wavelength described above, as shown in FIG. 1, the single-crystal lithium tetraborate is cut so that the direction of propagation is set in the direction satisfying the relationship $\theta m = 90° \pm 2°$, where $\theta m$ is an angle between the direction of propagation and the c-axis.

Accordingly, a continuous wave laser beam having a wavelength of 244 nm or 248.25 nm can be generated stably by non-critical phase matching.

DESCRIPTION OF THE PREFERRED EMBODIMENTS

Single-crystal lithium tetraborate used in the present invention is suitable for a frequency conversion crystal for obtaining a laser beam in the ultraviolet region from infrared light because, in comparison with other crystals, the deliquescence is decreased, excellent humidity resistance is exhibited, and a laser-induced damage threshold (durability to laser light) is significantly increased. The transparent region for the wavelength of an incident laser beam is also large, and it is possible to grow large crystals of good quality, and thus excellent workability is exhibited. However, with respect to the single-crystal lithium tetraborate, the nonlinear optical constant corresponding to the wavelength conversion efficiency is small, which is disadvantageous. Since the wavelength conversion efficiency is proportional to the square of the crystal length, the conversion efficiency can be improved by increasing the crystal length of single-crystal lithium tetraborate. However, if the crystal length is increased, the angular bandwidth, the spectral bandwidth, etc. are narrowed. Since wavelength-converted light has a different wavelength from that of incident light, a certain angle (beam walk-off angle) occurs in relation to the travelling direction of the incident light due to dispersion of the refractive index. The beam walk-off decreases the conversion efficiency. When the cross section of an incident light beam is circular, the cross section of a converted light beam is flattened and becomes elliptical.

Therefore, with respect to single-crystal lithium tetraborate, the present inventors have discovered a method of converting a wavelength without decreasing the wavelength conversion efficiency per unit length of the single crystal by non-critical phase matching in which beam walk-off does not occur. That is, in accordance with the present invention, single-crystal lithium tetraborate which does not greatly absorb ultraviolet light is used instead of the conventional BBO crystals. For example, with respect to a light beam having a wavelength of 488 nm or 496.5 nm of an argon laser, the angular bandwidth is significantly increased by non-critical phase matching which does not cause beam walk-off, a continuous wave laser beam having a wavelength of 244 nm or 248.25 nm can be generated stably.

Figure 1:
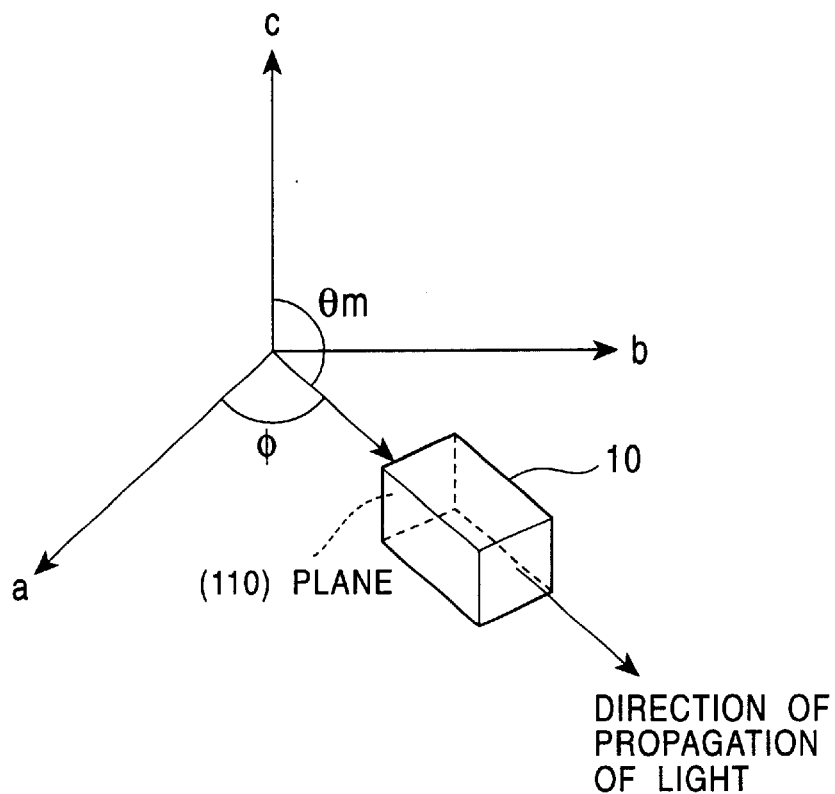
FIG. 1 is a schematic diagram showing a relationship between the orientation of the crystal axes of a wavelength conversion device composed of single-crystal lithium tetraborate and the direction of propagation of light in accordance with the present invention.

In order to achieve a non-critical phase matching, as shown in FIG. 1, single-crystal lithium tetraborate 10 is cut so that the direction of propagation of light is set in the direction satisfying the relationship $\theta m = 90° \pm 2°$, where $\theta m$ is an angle between the direction of propagation of light and the c-axis. If the angle $\theta m$ is out of the range described above, the angular bandwidth of the single-crystal lithium tetraborate is not satisfied, and thus the angle $\theta m$ is set at $90° \pm 2°$, and most preferably, at 90°. If the angle $\theta m$ is set at 90°, when a single crystal of lithium tetraborate is grown using a seed crystal in which single-crystal lithium tetraborate is cut in the <110> orientation by the Czochralski method or the Bridgman method, the cutting face of the grown single crystal can be easily determined. Since the lithium tetraborate single crystal is a negative uniaxial crystal, only the angle $\theta m$ between a laser beam for generating second harmonics and the c-axis (optical axis) must be taken into consideration for the non-critical phase matching condition, and a rotational angle $\phi$ on the c plane may be disregarded.

In order to achieve a non-critical phase matching condition with respect to a wavelength of 488 nm of an argon laser, the temperature of the single-crystal lithium tetraborate must be set at 13.5±10° C., preferably 13.5±2° C. If the temperature is out of the range described above, it is not possible to convert the wavelength of 488 nm by non-critical phase matching. More preferably, the temperature is set at 13.5±1° C. Therefore, wavelength conversion must be performed while a wavelength conversion device composed of single-crystal lithium tetraborate is maintained at a predetermined temperature by a temperature regulator which uses a Peltier element or the like.

In order to achieve a non-critical phase matching condition with respect to a wavelength of 496.5 nm of an argon laser, the temperature of the single-crystal lithium tetraborate must be set at 300° C. to 500° C. The reason for limiting the temperature of the single-crystal lithium tetraborate to 300° C. to 500° C. is that the non-critical phase matching wavelength is longer than 496.5 nm if the temperature is less than 300° C. and the non-critical phase matching wavelength is shorter than 496.5 nm if the temperature exceeds 500° C. Preferably, the temperature is set at 350° C. to 450° C., and more preferably, at 400° C. Therefore, wavelength conversion must be performed while a wavelength conversion device composed of single-crystal lithium tetraborate is maintained at a predetermined temperature by a temperature regulator which uses an electric furnace or the like.

Next, the present invention will be described in accordance with examples and comparative examples.

EXAMPLE 1

In order to investigate non-critical phase matching of single-crystal lithium tetraborate, a lithium tetraborate single crystal having a length of 1 cm, a width of 1 cm, and a height of 1 cm was prepared. The (110) plane of the single crystal was polished and was set as a plane of incidence for a laser beam.

Figure 2:
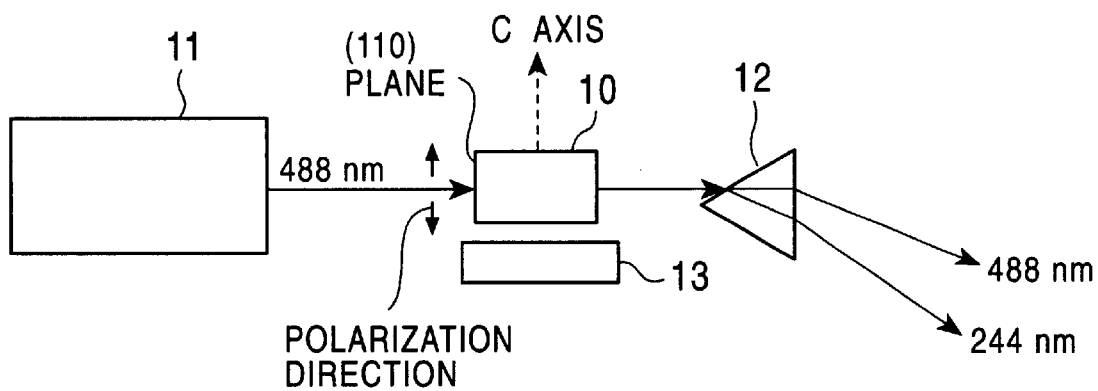
FIG. 2 is a schematic diagram showing an argon laser of example 1.

As shown in FIG. 2, a wavelength conversion device 10 composed of the lithium tetraborate single crystal was disposed between an argon laser 11 and a prism 12 in the optical path of the laser beam. The wavelength conversion device 10 was positioned so that an angle between the direction of an incident beam from the argon laser 11 and the c-axis was 90°. A temperature regulator 13 using a Peltier element for maintaining the wavelength conversion device 10 at a predetermined temperature was placed in the vicinity of the device 10. From the argon laser 11, a continuous wave laser beam having a wavelength of approximately 488 nm at 10 W was applied into the (110) plane of the device 10 while the temperature of the wavelength conversion device 10 composed of the lithium tetraborate single crystal was gradually raised from 10° C. to 17° C. Output light having a wavelength of 244 nm, which was dispersed by the prism 12, was observed.

The output of the laser apparatus was greatly increased in the temperature range of the device 10 between approximately 12° C. and approximately 16° C. The output generated in the temperature range was 1 mW which corresponded to approximately 12 times the output at 11° C. In the wavelength conversion device composed of the lithium tetraborate single crystal, the beam walk-off angle was 0°. When the non-critical phase matching condition was met, the temperature bandwidth (FWHM) was approximately 3.5° C.·cm, and the angular bandwidth was 1.52° C.·cm$^{1/2}$ (27 mrad·cm$^{1/2}$). Under such conditions, with respect to the lithium tetraborate single crystal, beam walk-off did not occur and wavelength conversion by non-critical phase matching was enabled.

COMPARATIVE EXAMPLE 1

For comparison, a BBO (BaB$_2$O$_4$) crystal having a length of 5 mm, a width of 5 mm, and a height of 5 mm was prepared. A wavelength conversion device composed of the crystal was disposed between an argon laser and a prism in the optical path of a laser beam and a Peltier temperature regulator for maintaining the wavelength conversion device at a predetermined temperature was placed in the vicinity of the device in a manner similar to that in example 1. The temperature of the wavelength conversion device composed of the BBO crystal was gradually raised in a manner similar to that in example 1. From the argon laser, a continuous wave laser beam having a wavelength of 488 nm at 10 W was applied to the wavelength conversion device composed of BBO. Output light having a wavelength of 244 nm, which was refracted by the prism, was observed.

When the wavelength conversion device composed of the BBO crystal was used, since the crystal is of the critical phase matching type, by rotating the angle of the crystal instead of changing the temperature, light having a wavelength of 244 nm at 8 mW maximum was observed. In the wavelength conversion device composed of the BBO crystal, the beam walk-off angle was 4.660°, in which the angular bandwidth was 0.25 mrad·cm. Since beam walk-off occurs in the BBO crystal, the wavelength conversion does not depend on non-critical phase matching.

EXAMPLE 2

Figure 3:
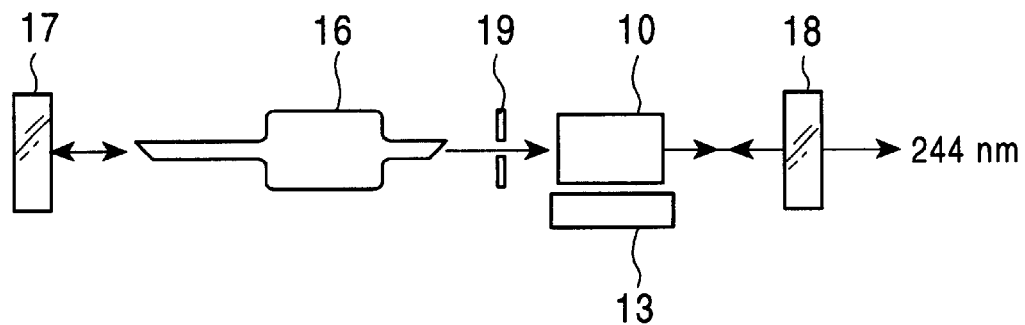
FIG. 3 is a schematic diagram showing an internal resonator of an argon laser of example 2.

In an argon laser shown in FIG. 3, a wavelength conversion device 10 composed of a lithium tetraborate single crystal having a length of 5 cm, a width of 1 cm, and a height of 1 cm and a temperature regulator 13 were placed. That is, the wavelength conversion device 10 was positioned in the optical path of a plasma tube 16 so that an angle between the direction of incident light and the c-axis of the lithium tetraborate single crystal was 90°. In a manner similar to that in example 1, the (110) plane of the lithium tetraborate single crystal was set as a plane of incidence for a laser beam. Numeral 17 represents a total reflecting mirror, numeral 18 represents an output mirror which is a half mirror, and numeral 19 represents an aperture.

Based on the results of example 1, while the temperature of the device 10 was maintained at 13.8° C. by the temperature regulator 13, a laser beam having a wavelength of 488 nm was emitted from the plasma tube 16 in the internal resonator of an argon laser. Light having a wavelength of 244 nm was emitted from the output mirror 18 due to wavelength conversion by the wavelength conversion device 10. The light of 244 nm had an output of 200 mW. After the operation was continuously performed for 10 hours, the crystal was not damaged and the output was stable.

COMPARATIVE EXAMPLE 2

Under the same conditions as those in example 2, a BBO (BaB$_2$O$_4$) crystal having a length of 5 mm, a width of 5 mm, and a height of 5 mm was placed in an argon laser, and a laser beam having a wavelength of 488 nm was generated from a plasma tube in a manner similar to that in example 2. Light having a wavelength of 244 nm was generated from an output mirror due to wavelength conversion by the BBO crystal. The light of 244 nm had an output of only 100 mW at maximum, and after the operation was continuously performed for 1 hour, the crystal was damaged, and thus the BBO crystal had poor durability to laser light.

EXAMPLE 3

In order to investigate non-critical phase matching of single-crystal lithium tetraborate at high temperatures, a lithium tetraborate single crystal, which was cut so that the direction of propagation of light form an angle of 90° with the c-axis, having a length of 1 cm, a width of 1 cm, and a height of 1 cm was prepared. The (110) plane of the single crystal was polished and was set as a plane of incidence for a laser beam.

Figure 4:
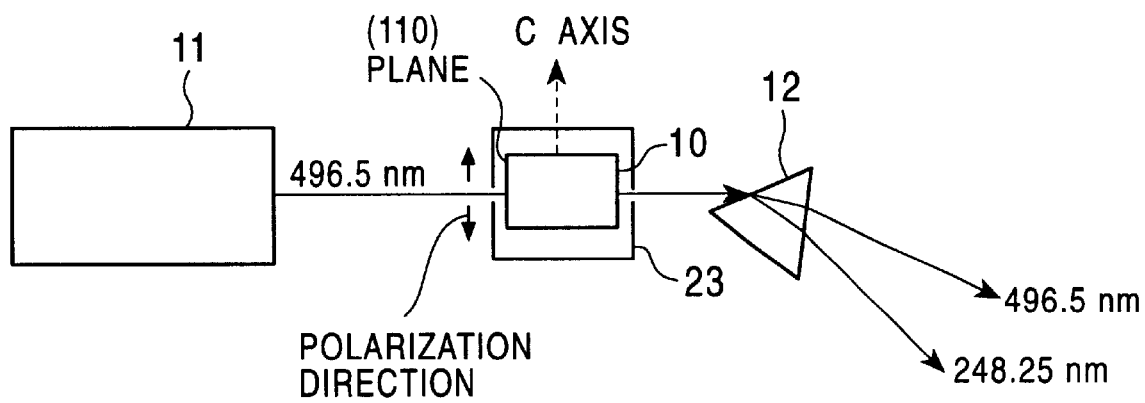
FIG. 4 is a schematic diagram showing an argon laser of example 3.

As shown in FIG. 4, a wavelength conversion device 10 composed of the lithium tetraborate single crystal was disposed between an argon laser 11 and a prism 12 in the optical path of the laser beam. The wavelength conversion device 10 was positioned so that an angle between the direction of an incident beam from the argon laser 11 and the c-axis was 90°. A temperature regulator 23 using an electric furnace for maintaining the wavelength conversion device 10 at a predetermined temperature was placed in the vicinity of the device 10. From the argon laser 11, a continuous wave laser beam having a wavelength of approximately 496.5 nm at approximately 5 W was applied to the (110) plane of the device 10 while the temperature of the wavelength conversion device 10 was gradually raised from room temperature to 550° C. by the temperature regulator 23. Output light having a wavelength of 248.25 nm, which was dispersed by the prism 12, was observed.

The output of the laser apparatus was greatly increased in the temperature range of the device 10 between approximately 300° C. to approximately 500° C. The output generated in the temperature range was 0.5 mW, which corresponded to approximately 10 times the output at room temperature. In the wavelength conversion device composed of the lithium tetraborate single crystal, the beam walk-off angle was 0°. When the non-critical phase matching condition was met, the temperature bandwidth (FWHM) was approximately 3° C.·cm, and the angular bandwidth was 1.5°·cm$^{1/2}$ (27 mrad·cm$^{1/2}$). Under such conditions, with respect to the lithium tetraborate single crystal, beam walk-off did not occur and wavelength conversion by non-critical phase matching was enabled.

Furthermore, the same experiment as that described above was conducted using a lithium tetraborate single crystal having a length of 5 cm, a width of 1 cm, and a height of 1 cm, and a light beam having a wavelength of 248.25 nm at an output of 3 mW maximum was confirmed in the temperature range from approximately 300° C. to approximately 500° C.

COMPARATIVE EXAMPLE 3

For comparison, a BBO (BaB$_2$O$_4$) crystal having a length of 0.5 cm, a width of 0.5 cm, and a height of 0.5 cm was prepared. A wavelength conversion device composed of the crystal was disposed between an argon laser and a prism in the optical path of a laser beam and a temperature regulator including an electric furnace for maintaining the wavelength conversion device at a predetermined temperature was placed in the vicinity of the device in a manner similar to that in example 3. The temperature of the wavelength conversion device composed of the BBO crystal was gradually raised in a manner similar to that in example 3. From the argon laser, a continuous wave laser beam having a wavelength of 496.5 nm at 10 W was applied to the wavelength conversion device composed of BBO. Output light having a wavelength of 248.25 nm, which was dispersed by the prism, was observed.

When the wavelength conversion device composed of the BBO crystal was used, since the crystal is of the critical phase matching type, by rotating the angle of the crystal instead of changing the temperature, light having a wavelength of 248.25 nm at a maximum of 2 mW was confirmed. In the wavelength conversion device composed of the BBO crystal, the beam walk-off angle was 4.6°, in which the angular bandwidth was 0.25 mrad·cm. Since beam walk-off occurs in the BBO crystal, the wavelength conversion does not depend on non-critical phase matching.

EXAMPLE 4

Figure 5:
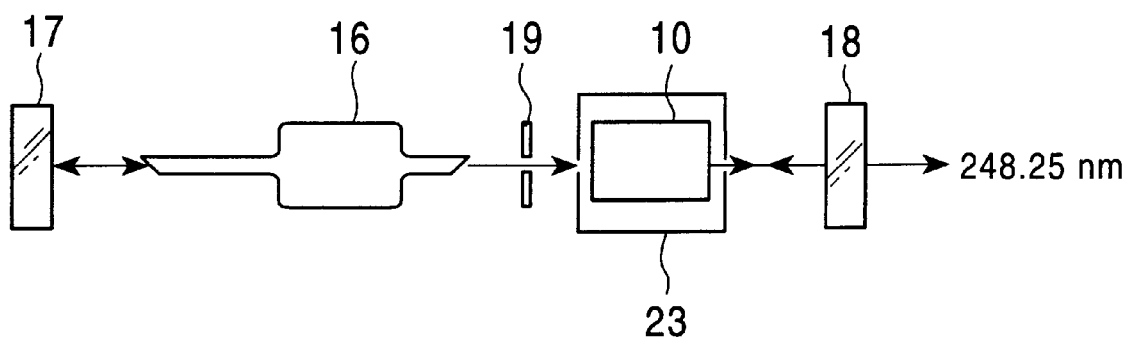
FIG. 5 is a schematic diagram showing an internal resonator of an argon laser of example 4.

In an argon laser shown in FIG. 5, a wavelength conversion device 10 composed of a lithium tetraborate single crystal having a length of 5 cm, a width of 1 cm, and a height of 1 cm and a temperature regulator 23 including an electric furnace were placed. That is, the wavelength conversion device 10 was positioned in the optical path of a plasma tube 16 so that an angle between the direction of incident light and the c-axis of the lithium tetraborate single crystal was 90°. In a manner similar to that in example 3, the (110) plane of the lithium tetraborate single crystal was set as a plane of incidence for a laser beam. Numeral 17 represents a total reflecting mirror, numeral 18 represents an output mirror which is a half mirror, and numeral 19 represents an aperture.

Based on the results of example 3, while the temperature of the device 10 was maintained in the range from 300° C. to 500° C. by the temperature regulator 23, a laser beam having a wavelength of 496.5 nm was emitted from the plasma tube 16 in the internal resonator of an argon laser. Light having a wavelength of 248.25 nm was generated from the output mirror 18 due to wavelength conversion by the wavelength conversion device 10. The light of 248.25 nm had an output of 100 mW. After the operation was continuously performed for 10 hours, the crystal was not damaged and the output was stable.

COMPARATIVE EXAMPLE 4

Under the same conditions as those in example 4, a BBO (BaB$_2$O$_4$) crystal having a length of 0.5 cm, a width of 1 cm, and a height of 1 cm was placed in an argon laser, and a laser beam having a wavelength of 496.5 nm was generated from a plasma tube in a manner similar to that in example 4. Light having a wavelength of 248.25 nm was emitted from an output mirror due to wavelength conversion by the BBO crystal. Although the light of 248.25 nm had an output of 100 mW maximum, inferior time stability was exhibited, and after the operation was continuously performed for 1 hour, the crystal was damaged, and thus the BBO crystal had poor durability to laser light.

As described above, in accordance with the present invention, by using a wavelength conversion device composed of single-crystal lithium tetraborate which is suitable for wavelength conversion by non-critical phase matching, a continuous wave laser beam having a wavelength of 244 nm or 248.25 nm can be generated stably.

What is claimed is:

1. A method of converting a wavelength of a laser beam incident on a wavelength conversion device comprising single-crystal lithium tetraborate, comprising the steps of:

determining the relationship between the orientation of the crystal axis of the single-crystal lithium tetraborate and the direction of incidence of the laser beam so that beam walk-off does not occur in the laser beam propagating through the wavelength conversion device;

maintaining the wavelength conversion device in a temperature range of 13.5±2° C.; and passing a laser beam having a wavelength of 488 nm through the wavelength conversion device to emit a laser beam having a wavelength of 244 nm.

2. A method of converting a wavelength of a laser beam incident on a wavelength conversion device comprising single-crystal lithium tetraborate, comprising the steps of:

determining the relationship between the orientation of the crystal axis of the single-crystal tetraborate and the direction of incidence of the laser beam so that beam walk-off does not occur in the laser beam propagating through the wavelength conversion device;

maintaining the wavelength conversion device in a temperature range from 300° C. to 500° C.; and passing a laser beam having a wavelength of 496.5 nm through the wavelength conversion device to emit a laser beam having a wavelength of 248.25 nm.

3. A method of converting a wavelength according to claim 1 wherein the single-crystal lithium tetraborate is cut so that the direction of propagation is set in the direction satisfying the relationship θm=90°±2°, where θm is an angle between the direction of propagation and the c-axis.

4. A method of converting a wavelength according to claim 2, wherein the single-crystal lithium tetraborate is cut so that the direction of propagation is set in the direction satisfying the relationship θm=90°±2°, where θm is an angle between the direction of propagation and the c-axis.

* * * * *